March 5, 1935.  C. E. SWENSON  1,993,192
UNIVERSAL JOINT
Filed July 25, 1932   2 Sheets-Sheet 1

March 5, 1935. C. E. SWENSON 1,993,192
UNIVERSAL JOINT
Filed July 25, 1932 2 Sheets-Sheet 2
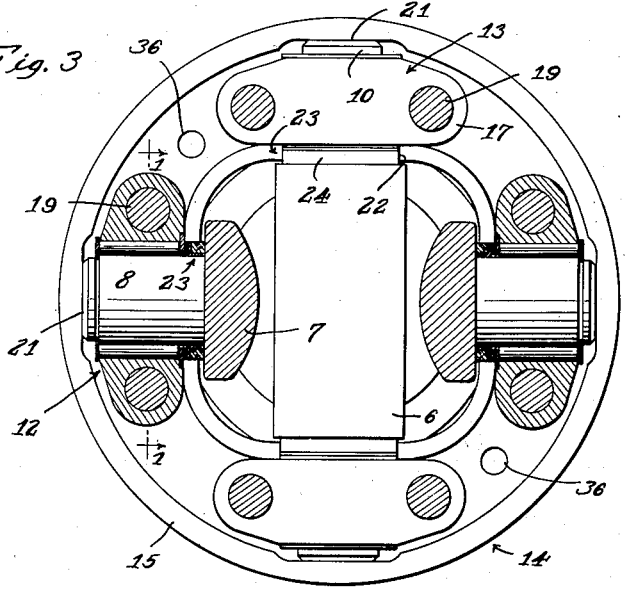
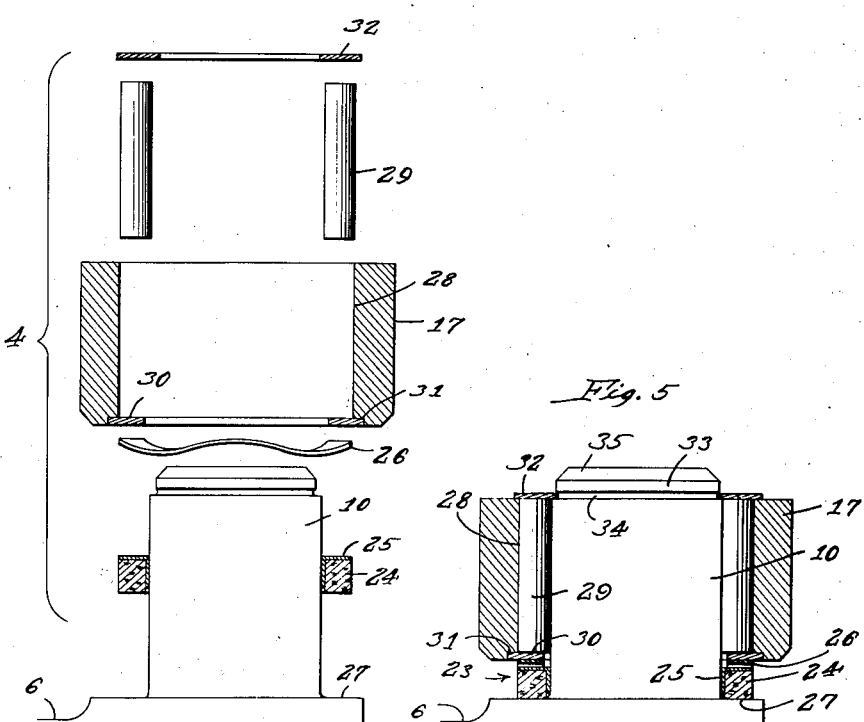
Inventor:
Carl E. Swenson
By Wilson, Dowell, McCanna & Rehm
Attys.

Patented Mar. 5, 1935

1,993,192

UNITED STATES PATENT OFFICE 1,993,192

UNIVERSAL JOINT

Carl E. Swenson, Rockford, Ill., assignor to Mechanics Universal Joint Company, Rockford, Ill., a corporation of Illinois Application July 25, 1932, Serial No. 624,600

7 Claims. (Cl. 64—102)

This invention relates to universal joints of the trunnion type suitable for use on motor vehicles.

In my Patent No. 1,673,925, I disclose a universal joint having a ring-shaped housing serving as an oil-tight container for the lubricant, as well as a mounting for the trunnion bearings. It is the principal object of my present invention to provide a practical joint of that kind having roller bearings instead of plain journal bearings. The roller bearings in accordance with my invention are so constructed that they may be assembled on the trunnions of the yoke members each as a complete sub-assembly, after which the two halves of the ring housing may be bolted thereto from opposite sides so as to mount the bearings in the housing and at the same time clamp the housing sections tightly together to retain lubricant therein.

The invention is illustrated in the accompanying drawings, in which—

Fig. 3 is a cross-section on the line 3—3 of Figure 1;

Fig. 4 is a dis-assembled view of the parts forming one of the trunnion bearings and indicating the order of their assembly, and Fig. 5 is a cross-section through the bearing when assembled.

The same reference numerals are applied to corresponding parts throughout the views.

Figure 1:
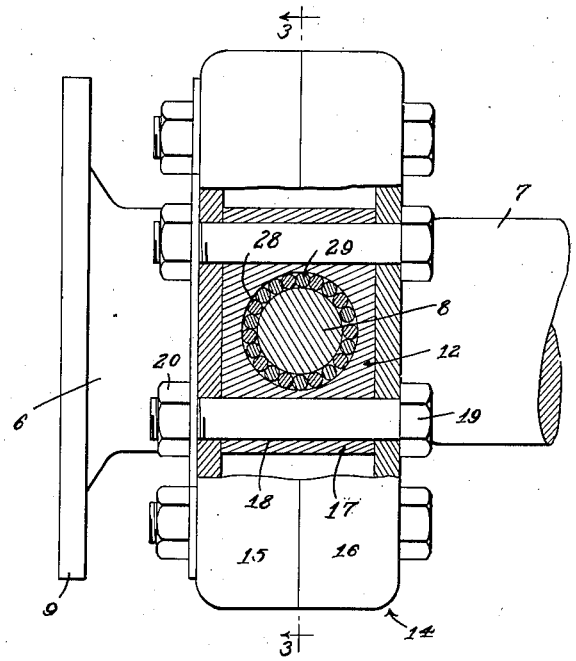
Figure 1 is a side view of a universal joint made in accordance with my invention showing one of the bearings in cross-section on the line 1—1 of Fig. 3.
Figure 2:
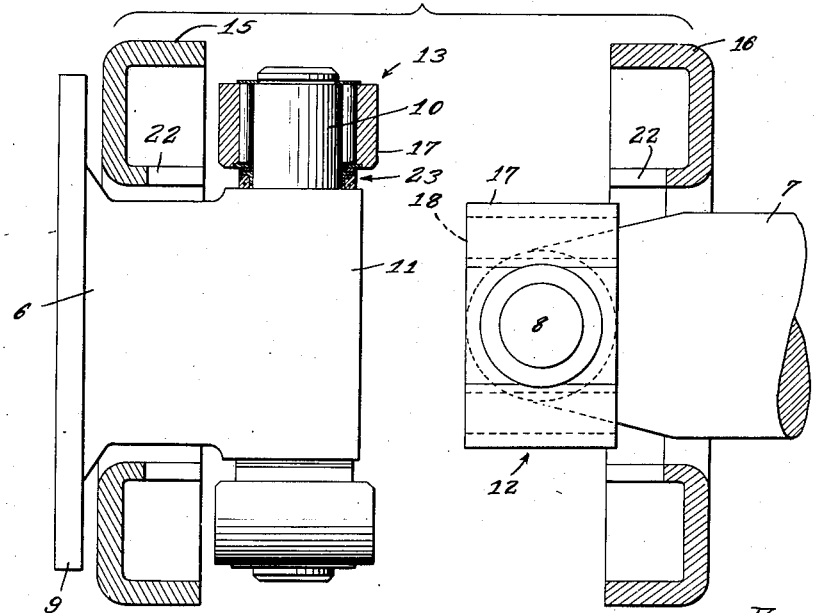
Fig. 2 is a view indicating the relationship of the yokes and bearings to the ring housing sections when the joint is being assembled.

The universal joint comprises yokes 6 and 7, one of which is connected with the driving part and the other with the driven part. The yoke 7 is of the conventional forged type having diametrically opposed trunnions 8 suitably formed integral therewith. The yoke 6 on the other hand is stamped from sheet metal to provide a coupling flange 9 integral with the body portion thereof, the trunnions 10 being provided by the projecting ends of a pin driven through the portion 11 of the yoke, as set forth in the copending application of Oscar H. Harrison, Serial No. 587,694, filed January 20, 1932. Bearings for the trunnions 8 are indicated generally by the numeral 12, and other bearings for the trunnions 10 by the numeral 13. A ring-shaped housing 14 for connecting the trunnions as well as supplying lubricant thereto is made up of two sections 15 and 16 stamped from sheet metal, the section 15 being assembled on the yoke 6 before the pin which provides the trunnions 10 has been driven into place, and the section 16 being simply slipped over the end of the yoke into position alongside the trunnions 8, as indicated in Fig. 2. Disregarding for the moment the other details of construction of the bearings 12 and 13, it will be seen that they each comprise a bearing block 17 having parallel holes 18 extending therethrough on opposite sides of the trunnion received in the bearing, whereby to permit the passage of bolts 19 through the housing sections 15 and 16, passing through the bearing blocks, and receiving nuts 20 on their projecting threaded ends. When the nuts are tightened, the housing sections are clamped together and the bearings are at the same time secured in position therebetween. The purpose of this construction is to provide a suitable power transmitting connection between the trunnions while also allowing angular movement of one yoke with respect to the other, also to provide proper bearings for the trunnions and means for lubricating these bearings over a long period.

In accordance with the disclosure in my earlier patent, the trunnions 8 and 10 find end thrust bearing support on flat surfaces 21 machined on the inside of the outer flange of the housing sections, and half round notches 22 are provided in the inner flanges of said sections to accommodate the trunnions and the packing means 23 encircling the same. The latter, in accordance with the patent, consists of a packing washer 24 on a ferrule 25 mounted with a sliding fit on the trunnion, and a spring washer 26 arranged to bear against the out-turned flange of the ferrule to urge the packing washer 24 against a shoulder 27 around the base of the trunnion. The spring washer is placed under compression by the bearing on the trunnion so as to urge the packing washer 24 into snug engagement with the shoulder 27, whereby to prevent leakage of oil along the trunnion and out over the yoke member. Furthermore, the packing washer 24 in each instance maintains an oil-tight joint between the housing structure and each trunnion, due to the fact that the packing is compressed in the clamping together of the housing sections. The universal joint is, therefore, completely sealed against loss of lubricant, and also against entry of dirt and water.

The bearing construction is best illustrated in Figs. 4 and 5. The bearing block 17 has a cylindrical bearing recess 28 provided therein of the proper diameter to receive anti-friction rollers 29 therein around the trunnion 10, or 8 as the case may be, the rollers being arranged to run on the side of the trunnion on the one hand, and on the wall of the recess 28 on the other hand. A flat sheet metal ring 30 is pressed into a counterbore 31 provided in the lower end of the bearing block, and the flat lower ends of the rollers 29 are slidable on the smooth upper surface thereof. Another flat sheet metal ring 32 is pressed over the reduced upper end portion 33 of the trunnion and snapped into an annular groove 34 for permanent assembly on the trunnion. The flat upper ends of the rollers are slidable on the smooth bottom surface of the ring, and the peripheral portion of the ring overlaps the top of the block 17 enough to hold the latter in assembled position. The upper end of the trunnion is chamfered, as indicated at 35, to facilitate starting the ring 32 thereon, the inner diameter of the ring being slightly undersize with respect to the diameter of the portion 33 in order to be sure that the ring 32 will be retained in the groove 34.

In operation, the packing means 23 is assembled over the trunnion in the order indicated in Fig. 4, after which the bearing block 17 with the ring 30 pressed therein is dropped down in place to receive the rollers 29 therein around the trunnion. Then, the ring 32 is pressed down over the upper end of the trunnion in the manner described, compressing the spring washer 26 so as to place the packing means 23 under the desired pressure. The rollers 29 are of a uniform length such that they all have a predetermined clearance at their ends with respect to the rings 30 and 32 when the bearing is completely assembled, as shown in Fig. 5. Obviously, the various bearings each constitute a separate unitary sub-assembly on the yoke members to permit assembling of the joint, in the manner indicated in Fig. 2. When the housing 14 is fastened to the bearings 12 and 13, it is clear from an inspection of Fig. 3 that all of the bearings receive good lubrication by the washing therethrough of oil provided in the housing 14. One of the housing sections is usually provided with holes through which the housing may be filled with oil after the joint has been assembled, the holes being closed by suitable blocks, as indicated at 36 (Fig. 3).

It is believed the foregoing description conveys a good understanding of the invention, and while I have illustrated only a single working embodiment, it should be understood that various changes might be made in the construction without departing from the spirit and scope of the invention as expressed in the appended claims, in which—

I claim:

1. A universal joint comprising trunnion type yoke members, a sectional transmission housing, anti-friction bearings for the trunnions of the yoke members, packing means for each of the trunnions provided below the anti-friction bearing of said trunnion around the base portion of the trunnion, each of said bearings with its packing means being constructed for permanent assembly on its trunnion whereby to form a non-removable part of a unit with the yoke member prior to assembling of the bearings between the housing sections, and means to secure the sections of said transmission member together with the bearings and packing means held therebetween.

2. A universal joint comprising trunnion type yoke members, a sectional transmission housing, compressible packing means for each of said trunnions extending around the base portion of the trunnion, anti-friction bearings for the trunnions of said yoke members each comprising a bearing block having opposed flat surfaces for abutment with flat surfaces on the inside of the housing sections, anti-friction bearing elements, and means for retaining the bearing elements in the block and retaining the block together with the packing means on the trunnion, whereby the bearing and its packing means constitutes a non-removable part of a unitary assembly with the yoke member prior to assembly of the bearings between the housing sections, and means to secure the sections of the transmission housing together with the bearing blocks held therebetween so that the flat surfaces of said blocks are in tight engagement with the flat surfaces on said housing sections and so that the packing means is placed under compression between the housing sections.

3. A universal joint comprising trunnion type coupling members, a transmission housing formed of two annular sections having inturned flanges extending toward one another to form a peripheral wall and to jointly provide a lubricant reservoir, anti-friction bearings for said trunnions each comprising a bearing block having opposed flat side surfaces for abutment with flat surfaces on the two sections while the end of the trunnion received in the block has direct engagement with a flat surface on the inside of the peripheral wall for end thrust bearing support of the trunnion, and anti-friction bearing elements in said block to provide radial bearing support for the trunnion in the block when the block is supported on the housing, means for clamping the housing sections to the blocks with the flat surfaces of the blocks in tight engagement with the related flat surfaces on the housing sections, packing means encircling each trunnion below the bearing for engagement with a seat provided on the yoke member around the base of the trunnion, a spring washer acting against the packing means to urge the latter axially against its seat, and means secured on the upper end of the trunnion to hold the bearing block with its anti-friction bearing elements in place on the trunnion and with the spring washer under compression.

4. A universal joint as set forth in claim 3 wherein said packing means is constructed for compression radially, and the housing sections are formed to provide portions to encircle the packing means and place the same under compression when the housing sections are fastened in assembled position.

5. In a universal joint of the trunnion type comprising yoke members having trunnions, and a ring member for inter-connecting the trunnions of said yoke members, bearings for the trunnions of said yoke members carried by the ring member, each of said bearings comprising, in combination with the trunnion associated therewith, a bearing block having a cylindrical bearing recess provided therein of larger diameter than the trunnion, and having the trunnion received therein, anti-friction rollers disposed in the recess lengthwise with respect to the trunnion to ride on the trunnion and on the wall of the recess, retainer means for engaging the ends of the rollers at the lower end of the recess, and a retainer ring fixed on the trunnion and engaging the upper ends of the rollers to hold the same in place, and also engaging the upper end of the bearing block to keep the latter in a predetermined position.

6. In a universal joint of the trunnion type comprising yoke members having trunnions, and a ring member for inter-connecting the trunnions of said yoke members, bearings for the trunnions of said yoke members carried by the ring member, each of said bearings comprising, in combination with the trunnion associated therewith, a bearing block having a cylindrical bearing recess provided therein of larger diameter than the trunnion and having the trunnion received therein, anti-friction rollers disposed in the recess lengthwise with respect to the trunnion to ride on the trunnion and on the wall of the recess, a lower retainer ring on said block having engagement with the lower ends of the rollers, packing means encircling the trunnion below the bearing block and serving by engagement with the bottom of the ring to support the block in a predetermined position with respect to the trunnion, and an upper retainer ring fixed on the trunnion and engaging the upper ends of the rollers to hold the same in place, and also engaging the upper end of the bearing block to keep the latter in a predetermined position.

7. A universal joint as set forth in claim 6, wherein the upper retainer ring has a press fit on a reduced upper end portion of the trunnion for permanent assembly on the trunnion, and so as to determine by engagement of said ring with the annular shoulder defined at the lower end of the reduced portion the proper elevation of the bearing block on the trunnion.

CARL E. SWENSON.